Aug. 27, 1929. C. A. CAMPBELL 1,725,848
VENT VALVE FOR AIR BRAKES
Filed April 7, 1928
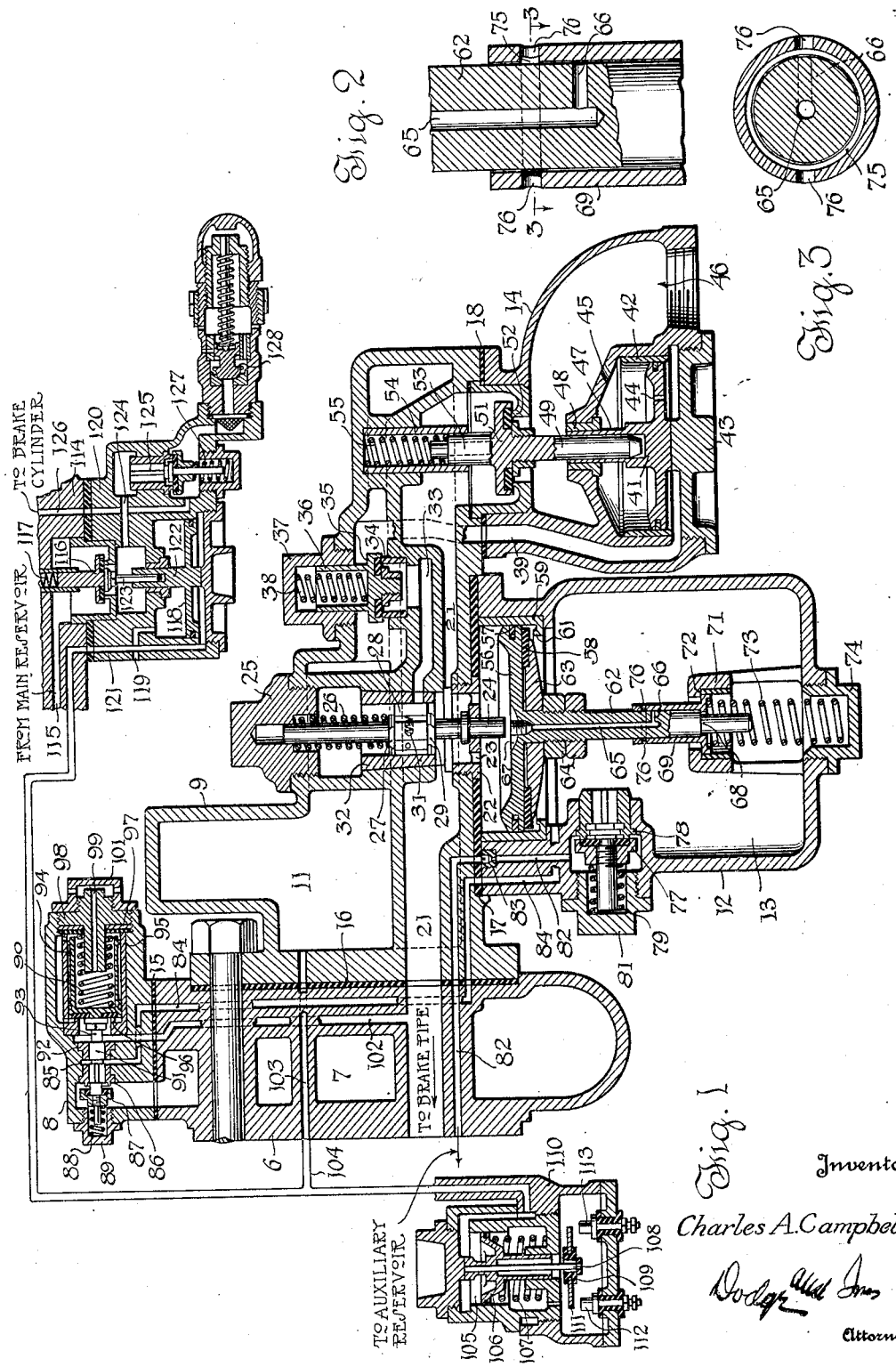
Inventor
Charles A. Campbell
Attorney Patented Aug. 27, 1929.

1,725,848

UNITED STATES PATENT OFFICE.

CHARLES A. CAMPBELL, OF WATERTOWN, NEW YORK, ASSIGNOR TO THE NEW YORK AIR BRAKE COMPANY, A CORPORATION OF NEW JERSEY.

VENT VALVE FOR AIR BRAKES.

Application filed April 7, 1928. Serial No. 268,131.

This invention relates to brake pipe vent valves and resides in certain features which secure certainty and rapidity of action.

The invention will be illustrated as embodied for use with an electro-pneumatic brake valve, and particularly the valve shown in my prior application Serial No. 224,718, filed October 7, 1927, since issued as Patent 1,702,152, February 12, 1929, in which combination it secures certain special results herein claimed. The emergency valve, however, is available for general use, and is by no means limited to the particular field of use chosen for illustration.

The two most important features of novelty are the construction of the valve so that back flow from the vent valve chamber or balancing chamber to the brake pipe is throttled in emergency position, and the use of a timing chamber and relay piston to operate the vent valve.

The first feature above set forth insures maintained action of the venting valve in emergency. This follows from the fact that the restricted back flow from the balancing chamber to the brake pipe in emergency assures that the piston will remain in emergency position for a longer time, assuming a fixed size of balancing chamber. It is thus possible either to secure a longer period of emergency action or to reduce the size of the balancing chamber, or both, thus securing the same or better action with economy of air.

The second novel feature, individually, but still more effectively in combination with the first, insures extremely rapid brake pipe venting such as could not be secured with prior devices. This arises from the fact that in the prior devices the size of the valve through which the brake pipe was vented to the atmosphere, was limited, because the valve was actuated directly by the vent valve piston and this piston was capable of exerting only a moderate force. Indirect actuation removes this difficulty which, because of the present tendency toward increased brake pipe volumes, was commencing to impose a serious limitation upon rapid operation.

Another feature of novelty in the combination of the throttled back flow in emergency, above mentioned, with a slow reduction emergency device which operates by admitting air from some other source, for example, a secondary reservoir, to the balancing chamber upon the slow reduction of brake pipe pressure below a certain critical value. The particular slow reduction emergency mechanism chosen for illustration is described and claimed in my prior application Serial No. 208,629, filed July 26, 1927, since issued as Patent 1,715,220, May 28, 1929, and hence is not claimed broadly herein.

The value of the combination just mentioned arises from the fact that because of throttling of back flow to the brake pipe in emergency the action of the slow reduction emergency device can be made more certain, even using a secondary reservoir of smaller capacity than was heretofore considered essential.

Other features of novelty will become apparent from a consideration of the following description taken in connection with the accompanying drawing, in which,—

Fig. 1 is a vertical section of the brake pipe vent valve and certain related apparatus forming part of the mechanism of my application Serial No. 224,718.

Fig. 2 is an enlarged view of a portion of Fig. 1 intended to illustrate the clearance between the piston rod and its guide.

Fig. 3 is a section on the line 3—3 of Fig. 2.

Referring chiefly to Fig. 1, 6 represents a body which may form a part of a pipe bracket and which contains a supplemental reservoir 7 and a number of passages which will hereinafter be more fully described.

Bolted to the top of the casting 6 is a casting 8 which houses a slow reduction emergency valve, and a casting 9 which encloses the timing chamber 11 and a number of passages forming part of the brake pipe vent mechansim, is bolted to the side.

Bolted to the casting 9 is a casting 12 which houses the balancing chamber 13 of the vent valve mechanism and certain other passages and parts related to the vent valve mechanism. Also bolted to the casting 9 is a casting 14 which houses the vent valve proper, the relay motor which actuates the vent valve and a number of related parts which will be described.

A gasket 15 is interposed between the castings 6 and 8, a gasket 16 is interposed between the castings 6 and 9, a gasket 17 is interposed between the castings 9 and 12 and a gasket 18 is interposed between the castings 9 and 14. These gaskets are of familiar construction and are provided with apertures which register with the passages in the castings. While the construction of the body above described is preferred, and conforms in a general way to known practice, it will be obvious that the housing for the valve mechanism might be constructed in various ways according to principles well understood in the art.

The brake pipe passage is shown at 21 and will be understood to communicate directly with the brake pipe as indicated by the legend applied to this passage. Screwed into the casting 9 and communicating with the passage 21 is a threaded bushing 22 which is formed with the ports 23 and with a guideway for the graduating stem 24. The graduating stem 24 is further guided in a threaded plug or cap 25 screwed into the casting 9. Cap 25 serves as a seat or abutment for the graduating spring 26 which seats at its other end on a collar 27 formed on the graduating stem 24.

The graduating stem 24 actuates a slide valve 28 which is confined between the collar 27 and a collar 29 also formed on the graduating stem. The valve 28 is urged by a spring 31 against a seat formed in a valve bushing 32. The bushing 32 is pressed to place in a recess formed in the casting 9 to receive it and has a port which forms a continuation of the passage 33. Passage 33 is cored in the casting 9 and leads to a valve seat bushing 34 with which there coacts a check valve 35. The valve 35 has a pilot or extension 36 which is guided in the cap plug 37. Cap plug 37 is threaded into the casting 9 and houses a spring 38 which acts to close the valve 35 against the seat 34. The valve 35 permits flow to an extension of the timing chamber 11 but prevents outflow. Inflow can occur only when the valve 28 opens the passage 33, and this occurs only when the graduating stem 24 is forced upward against the action of spring 26 to its extreme upward or emergency position.

Formed in the castings 9 and 14 is a passage 39 which leads to a space below a relay motor piston 41. The piston 41 works in a cylinder bushing 42 pressed to place in a portion of the casting 14. Access to this piston may be had by removing a threaded cap plug 43 which screws into the casting 14. There is a relatively minute timing passage 44, which is shown as formed in the piston 41 but might be otherwise located, and which serves to discharge to atmosphere at a definite rate the air with which the timing chamber 11 is charged during emergency function.

The air discharging through the port 44 escapes to atmosphere through passage 45 and the brake pipe vent port 46 which are formed in casting 14. The piston 44 is guided by tubular stem 47 which slides in a bushing 48 pressed into casting 14, and is in telescopic thrust relation with stem 49 of the emergency vent valve 51. This vent valve seats on a seating rim 52 formed on the bushing mounted in the casting 14. The valve 51 is further guided by a stem 53 which slides in a guide bushing 54 pressed in the casting 9. The valve is normally urged in a seating direction by a spring 55 mounted within the bushing 54 and acts in thrust against the end of the stem 53.

Immediately below the lower end of the graduating stem 24 is a vent valve piston 56. This is provided with a piston ring 57, of ordinary form, and a sealing gasket 58, which last is mounted on the lower face of the piston. The piston slides in a cylinder bushing 59 and this bushing has a sealing rim 61 at its lower end in position to engage the gasket 58 when the piston 56 is forced to its lowermost position.

Piston 56 is formed with an integral downwardly extending piston rod 62 and the gasket 58 is confined by a plate 63 locked in place by nuts 64 threaded on the piston rod 62. The rod 62 is provided with a passage 65 which extends from the upper face of the piston downwardly through the rod and then extends laterally, as indicated at 66, so as to terminate on the cylindrical side face of the piston rod 62.

Formed in the piston 56 at the upper end of the passage 65 is a groove or slot 67 which is merely for the purpose of preventing the end of the graduating stem 24 from sealing the end of the port 65. The lower end of the piston rod 62 is shouldered or reduced, as indicated at 68 and there enters into thrust engagement with a tubular member 69 which serves as a combined guide for the piston rod valve member and retard stop. The member 69 is guided in a bearing member 71 formed integrally with the casting 12 and its upward motion is limited by a shoulder 72 in such a way that when the member 69 is at its upward limit of travel the piston 56 will be sustained with its gasket 58 a slight distance above the rim 61. A spring 73 urges the member 69 to this position but will yield when brake pipe pressure predominates substantially over the pressure in chamber 13, to allow the gasket to seat temporarily against the rim 61.

A threaded plug 74 serves as a seat for the spring 73 and also permits the withdrawal of the spring 73 and the member 69 on occasion.

As is indicated on a larger scale in Figs. 2 and 3, the upper portion of the member 69 has a sleeve which encircles the piston rod 62 to a point above the highest limit of motion of the lateral passage 66, and the fit between the rod 62 and the member 69 is not close, but is sufficient to permit restricted communication between the brake pipe passage 21 and the chamber 13 at all times.

Formed on the interior of the member 69 is an annular groove 75 which communicates with ports 76 drilled in the member 69, and the groove 75 is so located that when the piston 56 moves up into contact with the graduating stem 24 but does not overpower the spring 26, the lateral passage 66 will register with the annular groove 75 so that in this position and only in this position a more free communication is offered between the brake pipe passage 21 and the chamber 13 than is offered in the lower or charging positions or in the extreme upper or emergency position of the piston.

To dissipate an overcharge in the chamber 13, such as might occur during release of the brakes at the forward end of the train, a check valve 77 is provided. This seats against a bushing 78 mounted in the casting 12, and is urged closed by a spring 79 housed in and reacting against a screw cap 81 threaded into the casting 12. Air discharging past the check valve 77 flows by way of passage 82 to the auxiliary reservoir, not shown, which, as will be understood by those skilled in the art, is associated with the triple valve whose action is to be accelerated by the brake pipe vent valve here described.

A choke 83 is interposed in the passage 82 to control the rate of flow.

Leading from the chamber 13 is a second passage 84 formed partly in the casting 12 and partly in the casting 6 and leading to a space 85 beneath the seat 86 of a check valve 87.

Check valve 87 is urged closed by a spring 88 confined by a screw cap 89 and has an extension 91 which projects through and makes a close sliding fit with a bushing 92 pressed into the casting 6. The extension 91 is in thrust engagement with a pin 93 on a combined piston and valve 94. The piston 94 slides in a cylinder bushing 95, is urged to the left by spring 90, and has at its left end a gasket which seals against a rim 96 at the left end of the bushing 95. It also has a rim at its right hand end which seals against the bushing 97 held in place by a threaded plug 98. The plug 98 has an axial port 99 and is locked in position by a ported cap 101.

Piston 94 is subject on its left end to brake pipe pressure arriving by passage 102 formed in the casting 6, but the close fit of extension 91 prevents brake pipe pressure from penetrating to the space 85.

The parts numbered 84 to 102 and the chamber 7 will be recognized as constituting the slow reduction emergency mechanism described and claimed in my prior application above identified, and not claimed here except in combination with novel features of the brake pipe vent valve.

In order to permit accessory apparatus to be operated synchronously with the brake pipe vent valve, a passage 103 leads from the timing chamber 11 and in order to make a full disclosure of the manner of using this connection I show in Fig. 1 certain parts of the valve mechanism described and claimed in my application for patent on electro-pneumatic brake valve, above identified. These are connected with the passage 103 by a branch pipe indicated diagrammatically at 104.

While various types of mechanism might be so operated, I show an electro-pneumatic switch designed to insure simultaneous emergency application of the brakes on all the cars connected in train, by electrical means. I also show a pneumatically operated valve for admitting main reservoir air to the brake cylinder.

The first of these two mechanisms comprises a casting 110 formed with the cylinder 105 in which works a piston 106 urged upward by a spring 107. The piston 107 carries a rod 108 and supported on this rod by means of an insulator 109 is a conductor disk 111, which, when the piston 106 moves downwardly, bridges the contacts 112, 113. The contacts 112 and 113 are connected in a circuit which includes one or more magnetically operated emergency valves, whose form is not material to the present invention.

The device for admitting main reservoir air to the brake cylinder is housed in castings 114 and 120, and is constructed in general as follows: 115 is a passage leading from the main reservoir or main reservoir pipe and is normally closed by a check valve 116 which is seated partly by main reservoir pressure and partly by a spring 117. A piston 118 is subject on its upper face to atmospheric pressure arriving through port 119 and may be urged upward by pressure arriving through the pipe 104 and passage 121 to act against its lower face. A piston rod 122 integral with the piston 118 is in telescopic thrust relation with the stem 123 of valve 116 and when the piston 118 moves upward it unseats the valve 116 and allows main reservoir air to flow to the brake cylinder by way of passage 115, passage 124, check valve 125 and passage 126. Passage 124 is formed in the casting 113 and the passage 126 is formed in the castings 113 and 114. The check valve 125 is of ordinary construction and is normally seated by a light spring 127. The spring loaded valve 128 is a safety valve of ordinary construction used to bleed away excess emergency brake pressure in the manner characteristic of the well known high speed brake and therefore requires no detailed explanation.

*Operation.*

Assuming that the system is uncharged and that the engineer charges the brake pipe by setting the engineer's brake valve first in release and then in running position, air arriving by passage 21 moves piston 56 to its lowest position, overpowering spring 73 and seating gasket 68 on rim 61. At such time valves 35 and 51 will be closed and graduating stem 24 will be in its lowermost position and piston 95 will be to the left, unseating valve 87. Chamber 13 will be charged at a relatively slow rate, determined by the clearance between stem 62 and member 69, and this flow will continue, charging the reservoir 13 and the reservoir 7 simultaneously until brake pipe pressure acting through port 102 overpowers spring 90 and moves piston 95 to the right so as to seal against the gasket 97. Charging of the reservoir 7 will then be momentarily arrested until the pressure in chamber 13 is sufficient to overpower spring 88, after which both chambers will be charged concurrently to substantially the same pressures. Charging will thereafter continue until the full brake pipe pressure is established in the brake pipe and in these reservoirs. At this time spring 73 will lift piston 56 slightly, to the position shown in Fig. 1. The purpose is to shift gasket 58 away from rim 61, so that while the gasket is effective to restrict the charging rate to the capacity of port 65 there will never be any possibility of the gasket 58 freezing to the rim 61, as might occur in cold weather.

It will be observed that since the timing chamber 11 is vented to atmosphere through the port 44, it remains at atmospheric pressure, that being its normal condition. If the engineer makes a service reduction of brake pipe pressure the piston 56 moves up until arrested by the graduating stem 24, at which time passage 66 registers with groove 75 and back flow to the brake pipe occurs at the maximum rate permitted by the size of the passage 66, 65. The size of this port is so chosen that back flow will occur at a rate commensurate with the rate of brake pipe reduction in service so that the pressure in chamber 13 will fall at the same rate as brake pipe pressure.

If the engineer reduces brake pipe pressure at an emergency rate, piston 56 will overpower the spring 26 and move upward until it seats against the gasket 17. At this time valve 28 permits flow of brake pipe air from passage 21 through passage 33 to check valve 35 which is forced open. The effect is to charge chamber 11. The pressure in chamber 11 acting through passage 39 forces piston 41 upward and unseats check valve 51. The unseating of this valve offers a direct discharge from the brake pipe passage 21 past valve 51, through passage 46 to atmosphere. The depletion of pressure in passage 21 will soon cause the closing of valve 35, so that pressure in the chamber 11 will persist regardless of the venting of the train pipe, and the open condition of valve 28. This pressure is reduced gradually by discharge through the port 44 until finally the piston 41 will be overpowered by the spring 55. At such time the valve 51 will seat preparatory to an ensuing release of the brakes.

It will be observed that when the piston 56 moves to emergency position, the passage 66 overtravels the grove 75 and therefore back flow from the chamber 13 to the brake pipe 21 can then occur only at the very slow rate permitted by the clearance between the steam 62 and the member 69.

The pressure in the timing chamber 11, acting through the passage 103 and pipe 104, forces piston 106 downward and closes the circuit in which the contacts 112 and 113 are connected. It also forces upward the piston 118, opens the valve 116 and permits high pressure air from the main reservoir to flow to the brake cylinder. The excess brake cylinder pressure thus established is dissipated by the safety valve 128 in a familiar manner.

The operation of the slow reduction emergency device is as follows:

Assume that a car, or a string of cars, is cut out from a train on a siding with the angle cocks closed and the system charged. Leakage from the system may or may not cause a service application of brakes, but when pressure in the passage 21 and communicating passage 102 falls below a critical value determined by the strength of spring 90, the piston 94 will move suddenly to the left, unseating the valve 87 and permitting the fluid pressure trapped in the reservoir 7, to flow by way of passage 84 to reservoir 13. The effect is to produce a sudden increase of pressure in the reservoir 13, sufficient to move the piston 56 upward to emergency position. This will insure emergency application of the brakes in the manner already described. This special function is assisted by the fact that when the piston 56 moves to emergency position the passage 66 will have overtraveled the groove 75 and the excess pressure established in reservoir 13 by flow from reservoir 7 is not dissipated so quickly as it would be in the devices of the prior art. Consequently it becomes possible, because of the slow back flow in emergency, not only to reduce the volume of reservoir 13 below that heretofore considered necessary, but it is also possible similarly to reduce the volume of the reservoir 7. As all this air must be derived from the brake pipe, the effect is not only to economize in the use of air, but also to facilitate the release of brakes in long trains, because the demand for air at this time is minimized.

As stated check valve 77 is for the purpose of bleeding away an overcharge in reservoir 13 to prevent an undesired reapplication after release.

As above stated the slow reduction emergency valve, the electro-pneumatic switch and the valve for controlling the main reservoir pressure form the subject matter of prior applications and hence are not individually claimed herein.

The construction above described in considerable detail is intended to be illustrative of the inventive concept and not limiting, and I contemplate possible modifications within the scope of the claims.

What is claimed is,—

1. In a brake pipe vent valve, the combination of a housing having a brake pipe port and a balancing chamber; a movable abutment interposed between said port and chamber and movable by variations of differential pressure to a charging position, an emergency position and a service position intermediate the two; valve means actuated by said abutment and controlling a communication between the brake pipe port and the balancing chamber and arranged to permit greater flow in service position than in emergency position; and a brake pipe vent valve controlled by said movable abutment.

2. In a brake pipe vent valve, the combination of a housing having a brake pipe port and a balancing chamber; a movable abutment interposed between said port and chamber and movable by variations of differential pressure to a charging position, an emergency position and a service position intermediate the two; valve means actuated by said abutment and controlling a communication between the brake pipe port and the balancing chamber and arranged to permit greater flow in service position than in emergency and in charging positions; and a brake pipe vent valve controlled by said movable abutment.

3. In a brake pipe vent valve, the combination of a housing having a brake pipe port and a balancing chamber; a movable abutment interposed between said port and chamber and movable by variations of differential pressure to a charging position, an emergency position and a service position intermediate the two; valve means actuated by said abutment and controlling a communication between the brake pipe port and the balancing chamber and arranged to permit greater flow in service position than in emergency position; a spring held graduating stem arranged to arrest said abutment in service position without compression of its spring and to be overpowered to permit movement to emergency position and a brake pipe vent valve controlled by the movements of said graduating stem.

4. In a brake pipe vent valve, the combination of a housing having a brake pipe port and a balancing chamber; a movable abutment interposed between said port and chamber and movable by variations of differential pressure to a charging position, an emergency position and a service position intermediate the two; valve means actuated by said abutment and controlling a communication between the brake pipe port and the balancing chamber and arranged to permit greater flow in service position than in emergency position; a brake pipe vent valve controlled by said movable abutment; an additional source of pressure fluid; and valve means responsive to the depletion of brake pipe pressure for admitting air from said source to said balancing chamber.

5. In a brake pipe vent valve, the combination of a housing having a brake pipe port and a balancing chamber; a movable abutment interposed between said port and chamber and movable by variations of differential pressure to a charging position, an emergency position and a service position intermediate the two; valve means actuated by said abutment and controlling a communication between the break pipe port and the balancing chamber and arranged to permit greater flow in service position than in emergency position; a spring held graduating stem arranged to arrest said abutment in service position without compression of its spring and to be overpowered to permit movement to emergency position; a brake pipe vent valve controlled by the movements of said graduating stem; an additional chamber arranged to be charged with pressure fluid from the balancing chamber; valve means normally preventing back flow from said additional chamber to the balancing chamber; and means controlled by the pressure in the brake pipe port and responsive to the depletion of brake pipe pressure beyond a chosen critical value to connect said chambers.

6. In a brake pipe vent valve the combination of a housing having a brake pipe port and a balancing chamber; a movable abutment interposed between said port and chamber and movable by variations of differential pressure to a charging position, an emergency position and a service position intermediate the two; valve means actuated by said abutment and controlling communication between said port and said chamber and arranged to permit greater flow in service position than in emergency position; a spring held graduating stem arranged to arrest said abutment in service position without compression of its spring and to be overpowered to permit movement to emergency position; a timing chamber having a vent; a second movable abutment subject on one side to pressure in said timing chamber; a brake pipe vent valve arranged to be opened by said second abutment when said timing chamber is charged; and a valve connected with said graduating stem to be opened thereby when said piston is in emergency position, said valve controlling flow from the brake pipe to said timing chamber to charge the latter.

7. In a brake pipe vent valve the combination of a housing having a brake pipe port and a balancing chamber; a movable abutment interposed between said port and chamber and movable by variations of differential pressure to a charging position, an emergency position and a service position intermediate the two; valve means actuated by said abutment and controlling communication between said port and said chamber and arranged to permit greater flow in service position than in emergency position; a spring held graduating stem arranged to arrest said abutment in service position without compression of its spring and to be overpowered to permit movement to emergency position; a timing chamber having a vent; a second movable abutment subject on one side to pressure in said timing chamber; a brake pipe vent valve arranged to be opened by said second abutment when said timing chamber is charged; a valve connected with said graduating stem to be opened thereby when said piston is in emergency position, said valve controlling flow from the brake pipe to said timing chamber to charge the latter; and means for operating brake applying apparatus by pressure in said timing chamber.

8. In a brake pipe vent valve, the combination of a housing having a brake pipe port and a balancing chamber; a movable abutment interposed between said port and chamber and movable by variations of differential pressure to a charging position, an emergency position and a service position intermediate the two; valve means actuated by said abutment and controlling communication between said port and said chamber and arranged to permit greater flow in service position than in charging position; a spring held graduating stem arranged to arrest said abutment in service position without compression of its spring and to be overpowered to permit movement to emergency position; a timing chamber having a vent; a second movable abutment subject on one side to pressure in said timing chamber; a brake pipe vent valve arranged to be opened by said second abutment when said timing chamber is charged; and a valve connected with said graduating stem to be opened thereby when said piston is in emergency position, said valve controlling flow from the brake pipe to said timing chamber to charge the latter.

9. In a brake pipe vent valve the combination of a housing having a brake pipe port and a balancing chamber; a movable abutment interposed between said port and chamber and movable by variations of differential pressure to a charging position; an emergency position and a service position intermediate the two; valve means actuated by said abutment and controlling communication between said port and said chamber and arranged to permit greater flow in service position than in charging position; a spring held graduating stem arranged to arrest said abutment in service position without compression of its spring and to be overpowered to permit movement to emergency position; a timing chamber having a vent; a second movable abutment subject on one side to pressure in said timing chamber; a brake pipe vent valve arranged to be opened by said second abutment when said timing chamber is charged; a valve connected with said graduating stem to be opened thereby when said piston is in emergency position, said valve controlling flow from the brake pipe to said timing chamber to charge the latter; and means for operating brake applying apparatus by pressure in said timing chamber.

10. In a brake pipe vent valve, the combination of a housing having a brake pipe port and a balancing chamber; a piston interposed between said port and chamber, and movable by variations of differential pressure to a charging position, an emergency position and a service position intermediate the two; a piston rod connected with said piston, said rod having a port which serves as a by-pass through the piston between the brake pipe port and the balancing chamber; a guide for said piston rod which fits the rod loosely and laps the port therein to permit restricted flow through said port, said guide having a port which registers with the port in the rod in service position whereby greater flow is permitted in service position than in other positions of the piston; and a brake pipe vent valve controlled by said piston.

11. In a brake pipe vent valve, the combination of a housing having a brake pipe port and a balancing chamber; a piston interposed between said port and chamber and movable by variations of differential pressure to a charging position, an emergency position and a service position intermediate the two; a piston rod connected with said piston, said rod having a port which serves as a by-pass through the piston between the brake pipe port and the balancing chamber; a guide for said piston rod which fits the rod loosely and laps the port therein to permit restricted flow through said port, said guide having a port which registers with the port in the rod in service position whereby greater flow is permitted in service position than in other positions of the piston; a spring held graduating stem arranged to arrest said piston in service position without compression of its spring and to be overpowered to permit movement to emergency position; a timing chamber having a vent; a second piston subject on one side to pressure in said timing chamber; a brake pipe vent valve arranged to be opened by said piston when the timing chamber is charged; and a valve connected with said graduating stem to be opened thereby when the piston moves to emergency position, said valve controlling flow from the brake pipe to said timing chamber to charge the latter.

12. In a brake pipe vent valve, the combination of a housing having a brake pipe port and a balancing chamber; a piston interposed between said port and chamber and movable by variations of differential pressure to a charging position, an emergency position and a service position intermediate the two; a piston rod connected with said piston, said rod having a port which serves as a by-pass through the piston between the brake pipe port and the balancing chamber; a guide for said piston rod which fits the rod loosely and laps the port therein to permit restricted flow through said port, said guide having a port which registers with the port in the rod in service position whereby greater flow is permitted in service position than in other positions of the piston; a spring held graduating stem arranged to arrest said piston in service position without compression of its spring and to be overpowered to permit movement to emergency position; a timing chamber having a vent; a second piston subject on one side to pressure in said timing chamber; a brake pipe vent valve arranged to be opened by said piston when the timing chamber is charged; a valve connected with said graduating stem to be opened thereby when the piston moves to emergency position, said valve controlling flow from the brake pipe to said timing chamber to charge the latter; and a connection for operating secondary apparatus by pressure in said timing chamber.

13. In a brake pipe vent valve, the combination of a housing having a brake pipe port and a balancing chamber; a cylinder interposed between the port and chamber, being open at its ends to the port and chamber respectively, and having a seating flange at the chamber end of the cylinder; a piston movable in said cylinder and interposed between said port and chamber, said piston being movable by variations of differential pressure to a charging position, an emergency position and a service position intermediate the two; means carried by said piston for sealing against said seating flange; a rod connected with said piston and having a port which serves as a by-pass through the piston between the brake pipe port and the balancing chamber; a combined piston rod stop, piston rod guide and valve member in which said piston rod is slidable, said combined member entering into thrust engagement with the piston rod in charging position to resist, but to permit when overpowered, seating of said sealing means on said sealing rim; a guide surrounding and making a loose fit with the rod and lapping the port therein to permit restricted flow through said port and having a port which registers with the port in the rod in service position to permit increased flow during service positions; a guide for said combined member including a stop which limits its motion; a retard spring urging said combined member to such limit of motion; and a brake pipe vent valve arranged to be opened upon the motion of said piston to emergency position.

14. In a brake pipe vent valve, the combination of a housing having a brake pipe port and a balancing chamber; a cylinder interposed between the port and chamber, being open at its ends to the port and chamber respectively, and having a seating flange at the chamber end of the cylinder; a piston movable in said cylinder and interposed between said port and chamber, said piston being movable by variations of differential pressure to a charging position, an emergency position and a service position intermediate the two; means carried by said piston for sealing against said seating flange; a rod connected with said piston and having a port which serves as a by-pass through the piston between the brake pipe port and the balancing chamber; a combined piston rod stop, piston rod guide and valve member in which said piston rod is slidable, said combined member entering into thrust engagement with the piston rod in charging position with the piston gasket unseated, said member having a guide portion surrounding and making a loose fit with the rod and lapping the port therein to permit restricted flow through said port, said guide portion having a port which registers with the port in the rod in service position to permit increased flow during service position; a guide for said combined member including a stop which limits its motion toward the piston; a retard spring urging said combined member to such limit of motion and capable of being overpowered by the piston; a spring-held graduating stem normally serving to arrest said piston in service position but capable of being overpowered to permit motion to emergency position; a timing chamber having a vent; a pressure motor operable by pressure in said chamber; a brake pipe vent valve operable by said motor; and a valve operable by said graduating stem to charge said timing chamber.

15. In a brake pipe vent valve the combination of a housing having a brake pipe port and a balancing chamber; a movable abutment interposed between said port and chamber and movable by variations of differential pressure to a charging position, an emergency position and a service position intermediate the two; valve means actuated by said abutment and controlling communication between said port and said chamber and arranged to permit greater flow in service position than in emergency position; a spring held graduating stem arranged to arrest said abutment in service position without compression of its spring and to be overpowered to permit movement to emergency position; a timing chamber having a vent; a second movable abutment subject on one side to pressure in said timing chamber; a brake pipe vent valve arranged to be opened by said second abutment when said timing chamber is charged; and a valve operable by said graduating stem and controlling the charging of said timing chamber.

16. In a brake pipe vent valve the combination of a housing having a brake pipe port and a balancing chamber; a movable abutment interposed between said port and chamber and movable by variations of differential pressure to a charging position, an emergency position and a service position intermediate the two; valve means actuated by said abutment and controlling communication between said port and said chamber and arranged to permit greater flow in service position than in emergency position; a spring held graduating stem arranged to arrest said abutment in service position without compression of its spring and to be overpowered to permit movement to emergency position; a timing chamber having a vent; a second movable abutment subject on one side to pressure in said timing chamber; a brake pipe vent valve arranged to be opened by said second abutment when said timing chamber is charged; a valve operable by said graduating stem and controlling the charging of said timing chamber; and a check valve interposed in the path of flow through the last named valve and serving to prevent back flow from the timing chamber.

17. In a brake pipe vent valve the combination of a housing having a brake pipe port and a balancing chamber; a movable abutment interposed between said port and chamber and movable by variations of differential pressure to a charging position, an emergency position and a service position intermediate the two; valve means actuated by said abutment and controlling communication between said port and said chamber and arranged to permit greater flow in service position than in emergency position; a spring held graduating stem arranged to arrest said abutment in service position without compression of its spring and to be overpowered to permit movement to emergency position; a timing chamber having a vent; a second movable abutment subject on one side to pressure in said timing chamber; a brake pipe vent valve arranged to be opened by said second abutment when said timing chamber is charged; a valve connected with said graduating stem to be opened thereby when said piston is in emergency position, said valve controlling flow from the brake pipe to said timing chamber to charge the latter; and a check valve interposed in the path of flow through the last named valve and serving to prevent back flow from the timing chamber.

18. In a brake pipe vent valve the combination of a housing having a brake pipe port and a balancing chamber; a movable abutment interposed between said port and chamber and movable by variations of differential pressure to a charging position, an emergency position and a service position intermediate the two; valve means actuated by said abutment and controlling communication between said port and said chamber and arranged to permit greater flow in service position than in emergency position; a spring held graduating stem arranged to arrest said abutment in service position without compression of its spring and to be overpowered to permit movement to emergency position; a timing chamber having a vent; a second movable abutment subject on one side to pressure in said timing chamber; a brake pipe vent valve arranged to be opened by said second abutment when said timing chamber is charged; a valve connected with said graduating stem to be opened thereby when said piston is in emergency position, said valve controlling the flow from the brake pipe to said timing chamber to charge the latter; a check valve interposed in the path of flow through the last named valve and serving to prevent back flow from the timing chamber; and means for operating brake applying apparatus by pressure in said timing chamber.

19. In a brake pipe vent valve, the combination of a housing having a brake pipe port and a balancing chamber; a movable abutment interposed between said port and chamber and movable by variations of differential pressure to a charging position, an emergency position and a service position intermediate the two; valve means actuated by said abutment and controlling communication between said port and said chamber and arranged to permit greater flow in service position than in charging position; a spring held graduating stem arranged to arrest said abutment in service position without compression of its spring and to be overpowered to permit movement to emergency position; a timing chamber having a vent; a second movable abutment subject on one side to pressure in said timing chamber; a brake pipe vent valve arranged to be opened by said second abutment when said timing chamber is charged; a valve connected with said graduating stem to be opened thereby when said piston is in emergency position, said valve controlling flow from the brake pipe to said timing chamber to charge the latter; and a check valve interposed in the path of flow through the last named valve and serving to prevent back flow from the timing chamber.

20. In a brake pipe vent valve the combination of a housing having a brake pipe port and a balancing chamber; a movable abutment interposed between said port and chamber and movable by variations of differential pressure to a charging position, an emergency position and a service position intermediate the two; valve means actuated by said abutment and controlling communication between said port and said chamber and arranged to permit greater flow in service position than in charging position; a spring held graduating stem arranged to arrest said abutment in service position without compression of its spring and to be overpowered to permit movement to emergency position; a timing chamber having a vent; a second movable abutment subject on one side to pressure in said timing chamber; a brake pipe vent valve arranged to be opened by said second abutment when said timing chamber is charged; a valve connected with said graduating stem to be opened thereby when said piston is in emergency position, said valve controlling flow from the brake pipe to said timing chamber to charge the latter; a check valve interposed in the path of flow through the last named valve and serving to prevent back flow from the timing chamber; and means for operating brake applying apparatus by pressure in said timing chamber.

In testimony whereof I have signed my name to this specification.

CHARLES A. CAMPBELL.